United States Patent
He et al.

(10) Patent No.: US 12,041,606 B2
(45) Date of Patent: Jul. 16, 2024

(54) SYSTEMS, METHODS, AND APPARATUS FOR RESOURCE ALLOCATION FOR A SCHEDULED PUSCH TRANSMISSION IN AN UNLICENSED SPECTRUM

(71) Applicant: APPLE INC., Cupertino, CA (US)

(72) Inventors: Hong He, Cupertino, CA (US); Chunhai Yao, Beijing (CN); Chunxuan Ye, San Diego, CA (US); Dawei Zhang, Cupertino, CA (US); Haitong Sun, Cupertino, CA (US); Jie Cui, Cupertino, CA (US); Oghenekome Oteri, San Diego, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 359 days.

(21) Appl. No.: 17/593,534

(22) PCT Filed: May 15, 2020

(86) PCT No.: PCT/CN2020/090497
§ 371 (c)(1),
(2) Date: Sep. 20, 2021

(87) PCT Pub. No.: WO2021/227000
PCT Pub. Date: Nov. 18, 2021

(65) Prior Publication Data
US 2022/0312444 A1 Sep. 29, 2022

(51) Int. Cl.
*H04W 72/1268* (2023.01)
*H04W 16/14* (2009.01)
(Continued)

(52) U.S. Cl.
CPC ....... *H04W 72/1268* (2013.01); *H04W 16/14* (2013.01); *H04W 72/23* (2023.01); *H04W 74/0833* (2013.01)

(58) Field of Classification Search
CPC ...... H04L 5/001; H04L 5/0053; H04W 16/14; H04W 72/1268; H04W 72/23; H04W 74/0833
See application file for complete search history.

(56) References Cited

U.S. PATENT DOCUMENTS

| 8,811,313 B2 * | 8/2014 | Papasakellariou .... H04W 72/02 370/329 |
| 10,952,231 B2 * | 3/2021 | Liou .................. H04W 72/046 |

(Continued)

FOREIGN PATENT DOCUMENTS

| CN | 110011757 A | * | 7/2019 | ........... H04L 1/0071 |
| CN | 110832931 A | | 2/2020 | |

(Continued)

OTHER PUBLICATIONS

MediaTek Inc., Remaining issues UL signals and channels for NR-U, Apr. 20, 2020, 3GPP TSG RAN WG1 #100bis, e-Meeting, Agenda Item: 7.2.2.1.3, Tdoc: R1-2001903 (Year: 2020).*

(Continued)

*Primary Examiner* — Eric Nowlin
(74) *Attorney, Agent, or Firm* — Dorsey & Whitney LLP

(57) ABSTRACT

A method for Resource Allocation for Msg-3 Transmission on an unlicensed spectrum may include receiving a random access response (RAR) grant comprising a 12-bit frequency domain resource allocation (FDRA) field. If the resource allocation type is type-1 some embodiments may zero padding the FDRA field to interpreting the 12-bit FDRA and determine a starting position of allocated resources where a Scheduled PUSCH Transmission is transmitted in an unlicensed spectrum. Some embodiments may use a virtual (Continued)

A DIAGRAM FOR COT STRUCTURE INDICATION

Bandwidth Part (BWP) to obtain a starting position and a length of allocated resources.

18 Claims, 13 Drawing Sheets

(51) Int. Cl.
*H04W 72/23* (2023.01)
*H04W 74/0833* (2024.01)

(56) References Cited

U.S. PATENT DOCUMENTS

| | | | | |
|---|---|---|---|---|
| 11,147,073 | B2* | 10/2021 | Liou | H04L 5/0092 |
| 11,665,749 | B2* | 5/2023 | Shin | H04L 5/0094 370/329 |
| 11,695,497 | B2* | 7/2023 | Fröberg | H04L 5/0053 370/329 |
| 2011/0085513 | A1* | 4/2011 | Chen | H04W 72/23 370/330 |
| 2011/0171985 | A1* | 7/2011 | Papasakellariou | H04W 72/0453 455/509 |
| 2016/0014778 | A1* | 1/2016 | Zhou | H04W 24/06 370/252 |
| 2019/0239198 | A1* | 8/2019 | Zhang | H04L 5/0007 |
| 2019/0349964 | A1* | 11/2019 | Liou | H04W 76/27 |
| 2021/0075537 | A1* | 3/2021 | Fröberg Olsson | H04W 72/53 |
| 2021/0160035 | A1* | 5/2021 | Kittichokechai | H04L 5/0053 |
| 2021/0298029 | A1* | 9/2021 | Liu | H04W 72/0453 |
| 2021/0329677 | A1* | 10/2021 | Huang | H04L 1/1896 |
| 2022/0201772 | A1* | 6/2022 | Shin | H04W 74/0841 |
| 2022/0232636 | A1* | 7/2022 | Shin | H04W 72/23 |
| 2022/0312444 | A1* | 9/2022 | He | H04W 72/23 |
| 2024/0073911 | A1* | 2/2024 | Abotabl | H04L 1/08 |

FOREIGN PATENT DOCUMENTS

| | | | | |
|---|---|---|---|---|
| CN | 112237041 | A * | 1/2021 | H04L 5/00 |
| CN | 112806079 | A * | 5/2021 | H04L 27/2602 |
| CN | 110011757 | B * | 1/2022 | H04L 1/0071 |
| CN | 114390679 | A * | 4/2022 | |
| CN | 115988663 | A * | 4/2023 | H04W 72/042 |
| EP | 3567967 | A1 * | 11/2019 | H04B 7/0413 |
| EP | 3567967 | B1 * | 2/2021 | H04B 7/0413 |
| EP | 3833135 | A1 * | 6/2021 | H04L 27/2602 |
| EP | 2524454 | B1 * | 9/2022 | H04W 72/02 |
| KR | 20120123417 | A * | 11/2012 | |
| KR | 101866577 | B1 * | 6/2018 | |
| KR | 102587428 | B1 * | 10/2023 | |
| RU | 2755148 | C1 * | 9/2021 | H04B 7/0413 |
| WO | WO-2011084014 | A2 * | 7/2011 | H04W 72/02 |
| WO | 2020085991 | A1 | 4/2020 | |
| WO | WO-2020194464 | A1 * | 10/2020 | |
| WO | WO-2021201659 | A1 * | 10/2021 | |
| WO | WO-2024044033 | A1 * | 2/2024 | H04L 1/08 |

OTHER PUBLICATIONS

Nokia et al., Remaining Issues on UL Signals and Channels for NR-U, Apr. 20, 2020, 3GPP TSG RAN WG1 #100bis, e-Meeting, Agenda Item: 7.2.2.1.3, Tdoc: R1-2002192 (Year: 2020).*
Spreadtrum Communications, Remaining issues in UL signals and channels, Apr. 20, 2020, 3GPP TSG RAN WG1 #100bis, e-Meeting, Agenda Item: 7.2.2.1.3, Tdoc: R1-2002276 (Year: 2020).*
LG Electronics, Remaining issues of UL signals and channels for NR-U, Feb. 24, 2020, 3GPP TSG RAN WG1 #100, e-Meeting, Agenda Item: 7.2.2.1.3, Tdoc: R1-2000662 (Year: 2020).*
Huawei et al., Maintenance on uplink signals and channels, Apr. 20, 2020, 3GPP TSG RAN WG1 #100bis, e-Meeting, Agenda Item: 7.2.2.1.3, Tdoc: R1-2001533 (Year: 2020).*
Vivo, Remaining issues on physical UL channel design in unlicensed spectrum, Apr. 20, 2020, 3GPP TSG RAN WG1 #100bis, e-Meeting, Agenda Item: 7.2.2.1.3, Tdoc: R1-2001651 (Year: 2020).*
Zte, Remaining issues on UL signals and Channels for NR-U, Apr. 20, 2020, 3GPP TSG RAN WG1 #100bis, e-Meeting, Agenda Item: 7.2.2.1.3, Tdoc: R1-2001704 (Year: 2020).*
Oppo, Discussion on the remaining issues of UL signals and channels, Apr. 20, 2020, 3GPP TSG RAN WG1 #100bis, e-Meeting, Agenda Item: 7.2.2.1.3, Tdoc: R1-2001758 (Year: 2020).*
Fujitsu, Remaining issues on UL signals and channels for NR-U, Apr. 20, 2020, 3GPP TSG RAN WG1 #100bis, e-Meeting, Agenda Item: 7.2.2.1.3, Tdoc: R1-2001875 (Year: 2020).*
LG Electronics, Remaining issues of UL signals and channels for NR-U, Apr. 20, 2020, 3GPP TSG RAN WG1 #100bis, e-Meeting , Agenda Item: 7.2.2.1.3, Tdoc: R1-2001934 (Year: 2020).*
Lenovo et al., Remaining issues for UL transmission for NR-U, Apr. 20, 2020, 3GPP TSG RAN WG1 #100bis, e-Meeting, Agenda Item: 7.2.2.1.3, Tdoc: R1-2001973 (Year: 2020).*
Ericsson, UL Signals and Channels, Apr. 20, 2020, 3GPP TSG RAN WG1 #100bis, e-Meeting, Agenda Item: 7.2.2.1.3, Tdoc: R1-2002030 (Year: 2020).*
Ericsson, Feature lead summary for Maintenance of UL Signals and Channels, Apr. 20, 2020, 3GPP TSG RAN WG1 #100bis, e-Meeting, Agenda Item: 7.2.2.1.3, Tdoc: R1-2002036 (Year: 2020).*
Samsung, Uplink signal and channel design for NR-U, Apr. 20, 2020, 3GPP TSG RAN WG1 #100bis, e-Meeting, Agenda Item: 7.2.2.1.3, Tdoc: R1-2002116 (Year: 2020).*
ETRI, UL signals and channels, Apr. 20, 2020, 3GPP TSG RAN WG1 #100bis, e-Meeting, Agenda Item: 7.2.2.1.3, Tdoc: R1-2002246 (Year: 2020).*
Apple Inc., Remaining issues of UL signals and channels, Apr. 20, 2020, 3GPP TSG RAN WG1 #100bis, e-Meeting, Agenda Item: 7.2.2.1.3, Tdoc: R1-2002321 (Year: 2020).*
Sharp, Remaining issues on UL signals/channels for NR-U, Apr. 20, 2020, 3GPP TSG RAN WG1 #100bis, e-Meeting, Agenda Item: 7.2.2.1.3, Tdoc: R1-2002382 (Year: 2020).*
NTT Docomo, Inc., Remaining issues on UL signals and channels for NR-U, Apr. 20, 2020, 3GPP TSG RAN WG1 #100bis, e-Meeting, Agenda Item: 7.2.2.1.3, Tdoc: R1-2002433 (Year: 2020).*
LG Electronics, "Remaining issues of UL signals and channels for NR-U", R1-2000662, 3GPP TSG RAN WG1 Meeting #100, e-Meeting, Agenda Item 7.2.2.1.3, Feb. 24-Mar. 6, 2020, 11 pages.
Nokia, Nokia Shanghai Bell, "On the alignment of DCI format sizes", R1-1804614, 3GPP TSG RAN WG1 Meeting #92bis, Sanya, China, Agenda Item 7.1.3.1.4, Apr. 16-20, 2018, 5 pages.
PCT/CN2020/090497, International Search Report and Written Opinion, Jan. 27, 2021, 9 pages.
Wilus Inc., "Remaining issues on PDCCH enhancement for NR URLLC", R1-2000935, 3GPP TSG RAN WG1 Meeting #100, e-Meeting, Agenda Item 7.2.5.1, Feb. 24-Mar. 6, 2020, 13 pages.
Ericsson, "Outcome of email thread [100e-NR-unlic-NRU-ULSignalsChannels-01]", R1-2001308, 3GPP TSG-RAN WG1 Meeting #100-e, e-Meeting, Agenda Item 7.2.2.1.3, Feb. 24-Mar. 6, 2020, 16 pages.
Samsung, "Corrections on shared spectrum channel access", R1-2001456, 3GPP TSG-RAN WG1 Meeting #100-e, e-Meeting, Change Request 38.213 CR 0091 Current Version 16.0.0, Feb. 24-Mar. 6, 2020, 20 pages.
Samsung, "Uplink signal and channel design for NR-U", R1-1912448, 3GPP TSG-RAN WG1 Meeting #99, Reno, Nevada, USA, Agenda Item 7.2.2.1.3, Nov. 18-22, 2019, 8 pages.

* cited by examiner

Table 1: COT Structure Indication

| Index | Available RB set Indicator | COT-Duration | Description of UE behavior |
|---|---|---|---|
| 1 | All zeros | All zeros | LBT fails on the associated serving cell |
| 2 | All zeros | K, K>0 | UE skip the PDCCH monitoring on the serving cell for a duration of K slot starting from the slot receiving the DCI format 2_0 |

FIG. 3

SYSTEMS, METHODS, AND APPARATUS FOR RESOURCE ALLOCATION FOR A SCHEDULED PUSCH TRANSMISSION IN AN UNLICENSED SPECTRUM

TECHNICAL FIELD

This application relates generally to wireless communication systems, and more specifically to Resource Allocation for an Msg-3 transmission on an unlicensed spectrum.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a table detailing a COT structure indication in accordance with one embodiment.

DETAILED DESCRIPTION

Figure 1:
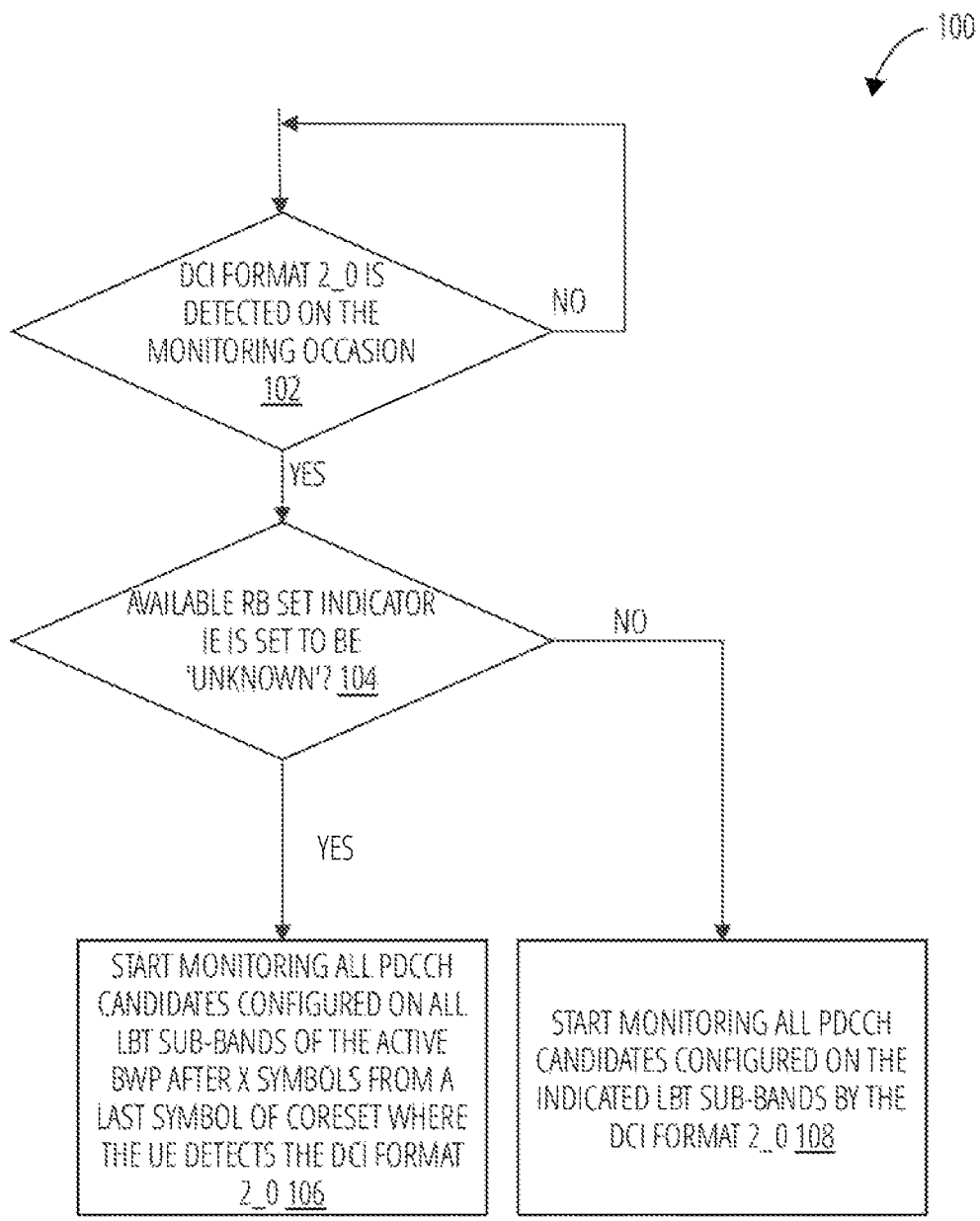
FIG. 1 is a flowchart of a method to be performed by a UE for a COT structure indication in accordance with one embodiment.

New radio (NR) for operation in an unlicensed spectrum (NR-U) has adopted a plurality of enhancements relating to resources between a user equipment (UE) and a Next Generation NodeB (gNB). These enhancements while beneficial may introduce overlooked issues. Accordingly, a variety of new ways to determine resources for wireless communications should be adopted to handle these overlooked issues.

For NR-U operation, Downlink Control Information (DCI) format 2_0 will be enhanced to provide Channel Occupancy Time (COT) structure to facilitate the UE in making the decision on deferring Physical Downlink Control Channel (PDCCH) monitoring or periodic CSI Reference Signal (CSI-RS) detection. This change to DCI format 2_0 may result in less power consumption at UE side. Additionally, the UE can be configured with up to 64 values for COT duration in unit of symbols based on reference Subcarrier Spacing (SCS). In addition, a bitmap is added to DCI format 2_0 to indicate the available LBT bandwidths.

Additional enhancements to the DCI format 2_0 may include away to communicate an "unknown" state to indicate LBT outcome for some LBT sub-bands. As one example, an "unknown" state for the LBT sub-bands may arise at the start of gNB initiated COT where gNB completes LBT operation very late and does not have sufficient time to prepare the DCI Format 2_0 to indicate the actual availability of the LBT sub-bands for the grabbed COT based on the outcome of LBT. Some embodiments described herein provide a way to signal the "unknown" state for LBT sub-bands within a wide-band BWP. Additionally, some embodiments describe how to indicate an LBT failure for a given serving cell that has been configured with Slot format indication (SFI) index field in DCI format 2_0.

Further, for NR-U operation, 2-bits of a frequency domain resource allocation (FDRA) field in uplink (UL) grant of Random Access Response (RAR) (Random Access Response) Medium Access Control (MAC) Protocol Data Unit (PDU) are repurposed to indicate the channel access parameters for CP Extension. The bits number of frequency domain resource allocation field (FDRA) in NR-U is reduced from 14 to 12, for operation with shared spectrum channel access. However, the FDRA field size to address the full resource blocks (RBs) range of a 20 MHz initial UL Bandwidth Part (BWP) (e.g., 107 physical resource block (PRB) for 15 kHz SCS and 51 PRBs for 30 kHz SCS) should be 13-bit for 15 kHz if the resource allocation type 1 is used. While, for interlace-based resources allocation type 2, the request FDRA field size would be 6-bits for 15 kHz SCS and 5-bits for 30 kHz SCS. Some embodiments herein describe how to interpret the 12-bit FDRA field in RAR MAC PDU for resource allocation on a 20 MHz initial BWP to properly address Msg-3 transmission of NR-U design. Msg-3 refers to Scheduled PUSCH Transmission (Msg3).

In type 1 Resource Allocation the resource is allocated to one or more consecutive RBs by using two configuration parameters starting RB index and number of consecutive RBs. Additionally, the resource allocation granularity is one RB.

In type 2 Resource Allocation the resource is allocated to one or more interlaces and each interlace consist of a set of PRBs. Additionally, the resource allocation granularity is one interlace.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a flowchart of a method 100 to be performed by a UE for receiving a COT structure indication using DCI format 2_0 and monitoring PDCCH within a corresponding COT in accordance with some embodiments.

In decision block 102 the method 100 attempts to detect a DCI format 2_0 from a gNB during a monitoring occasion. An DCI format 2_0 comprises an RB set indicator information element (IE) that indicates a state of Listen Before Talk (LBT) sub-bands, and a COT duration indicator IE. If the UE does not detect a DCI format 2_0 during the monitoring occasion, the method 100 repeats decision block 102 during a next monitoring occasion to continue to attempt to detect a DCI format 2_0.

When the method 100 detects a DCI format 2_0, the method 100 procedures to decision block 104 where the UE determines the state of the LBT sub-bands based on the available RB set indicator IE. In some embodiments, a special state of the Available RB set Indicator IE may be predefined to indicate the 'unknown' state for LBT sub-bands within the active BWP on the corresponding serving cell. For example, the unknown state may be indicated by an Available RB set Indicator IE that is set to be all zeros or all ones. In some embodiments, the Available RB set Indicator IE "b1b0" is set to 00, 10 to indicate the 'unknown' state, wherein 'b1' is associated with LBT sub-band 1 and '130' is associated with LBT sub-band 0 and UE detects the DCI format 2_0 on LBT sub-band 0. In some embodiments, the method 100 may include determining a value 'K' from the COT duration indicator IE.

When the Available RB set Indicator IE is not in an unknown state, the method 100 proceeds to block 108. In block 108, the method 100 starts monitoring all PDCCH candidates configured on the indicated LBT sub-bands by the DCI Format 2_0.

When the UE detects UE receives this 'unknown' state for LBT sub-bands of a serving cell and the corresponding COT duration 120 is valid, the method proceeds to block 106. The unknown state may be determined by the Available RB set Indicator IE in DCI Format 2_0, and the COT duration may be considered valid when the Cot duration indicator IE is set to a none-zero value 'K'.

Figure 2:
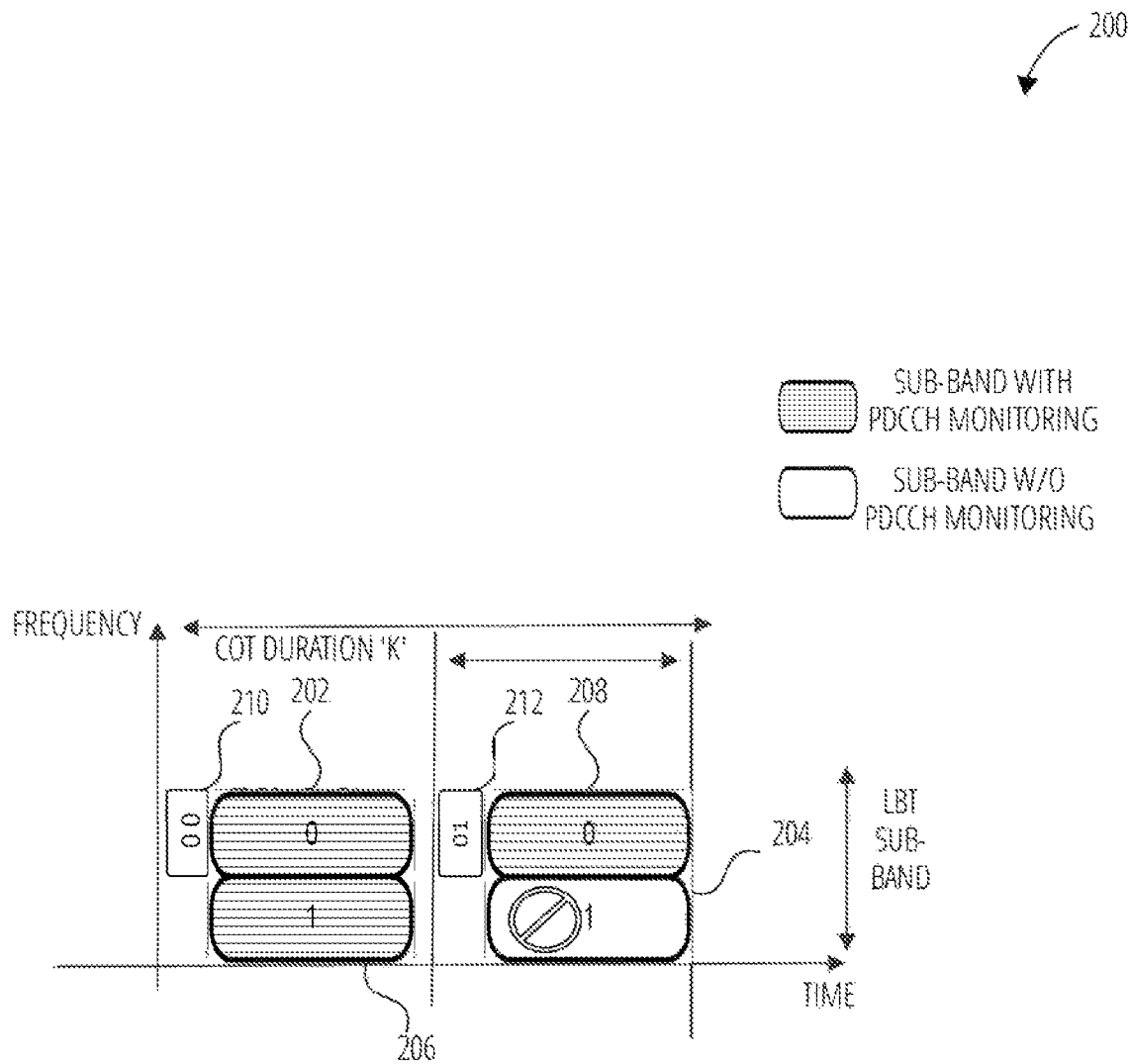
FIG. 2 provides a diagram of an example of a UE implementing the method of FIG. 1 in accordance with one embodiment.

Alternatively, In some embodiments, the UE may implicitly assume the LBT sub-band where it detects the DCI Format 2_0 with unknown state (e.g. all zeros or all ones) is available and monitor PDCCH candidates on it only. Referring to FIG. 2, using this alternative approach, UE would only assume LBT sub-band #0 is available and monitor PDCCH candidates on that sub-band. In other words, the UE would not monitor PDCCH candidates on LBT sub-band #1 in FIG. 2.

In block 106, the method starts monitoring all PDCCH candidates configured on all LBT sub-bands of the active BWP after X symbols from a last symbol of CORESET where the UE detects the DCI Format 2_0. The value for X symbols maybe either fixed in specification or configured by higher layers, mainly accounting for the processing latency of DCI format 2_0.

In some embodiments, within the COT duration 'K', UE switches to only monitoring PDCCH candidates on the LBT sub-bands that indicated by a separate DCI format 2_0 with valid LBT sub-bands state (i.e. not 'unknown' state) if the separate DCI format 2_0 is received later. For example, the UE may receive a subsequent DCI format 2_0 with a valid state for the LBT sub-bands. The valid state indicates available LBT sub-bands. Accordingly, the UE may switch from monitoring PDCCH candidates on all LBT sub-bands to monitoring PDCCH candidates on only the available LBT sub-bands based on valid states received in the later time.

FIG. 2 provides a diagram of an example of a UE implementing the method 100 of FIG. 1. As shown, the UE receives an Available RB set Indicator IE 210 with a bitmap of 00 indicating an 'unknown' state. Additionally, the COT duration is a non-zero number. Because of the COT duration and the unknown state, the UE monitors both LBT sub-band for PDCCH (i.e., sub-band 202, and sub-band 206). The UE then receives a subsequent Available RB set Indicator IE 212 that indicates the available LBT sub-band 208 is available and the LBT sub-band 204 is not available. Accordingly, the UE performs sub-band monitoring on sub-band 208 and not on LBT sub-band 204.

FIG. 3 illustrates a table 300 detailing a COT structure indication. The table 300 describes logic that the UE may apply based on the Available RB set Indicator IE and the COT duration.

As described with reference to FIGS. 1-2, the UE may skip PDCCH monitoring on a serving cell if the if the following IEs in DCI format 2_0 for the serving cell is met the conditions in index 2. In other words, the 'Available RB set Indicator' IE is set to 'unknown' state (e.g., all zeros) and 'COT duration indicator' is set to a nonzero value (e.g. K slots).

In addition, based on the DCI format 2_0 is transmitted on the serving cell, some embodiments may include solutions to indicate an LBT failure status for a given serving cell. Correspondingly, UE may stop PDCCH monitoring on the serving cell after receiving the LBT failure status notification based on detected DCI Format 2_0 that was transmitted on the serving cell. For example, in some embodiments, the UE may assume the LBT is failed on a serving cell if the IEs in DCI format 2_0 for the serving cell met the conditions in index 1. In other words, the 'Available RB set Indicator' IE is set to 'unknown' state (e.g., all zeros) and 'COT duration indicator' is set to a predefined value (e.g. all zeros). In some embodiments as shown in index 2 of FIG. 3, the combination of the 'Available RB set Indicator' IE to be 'unknown' state (e.g., all zeros) and 'COT duration indicator' to be a predefined non-zero value K is used to indicate UE to skip PDCCH monitoring on the serving cell for a duration of K slots starting from the slot where receives the DCI format 2_0 for power saving purpose.

Figure 4:
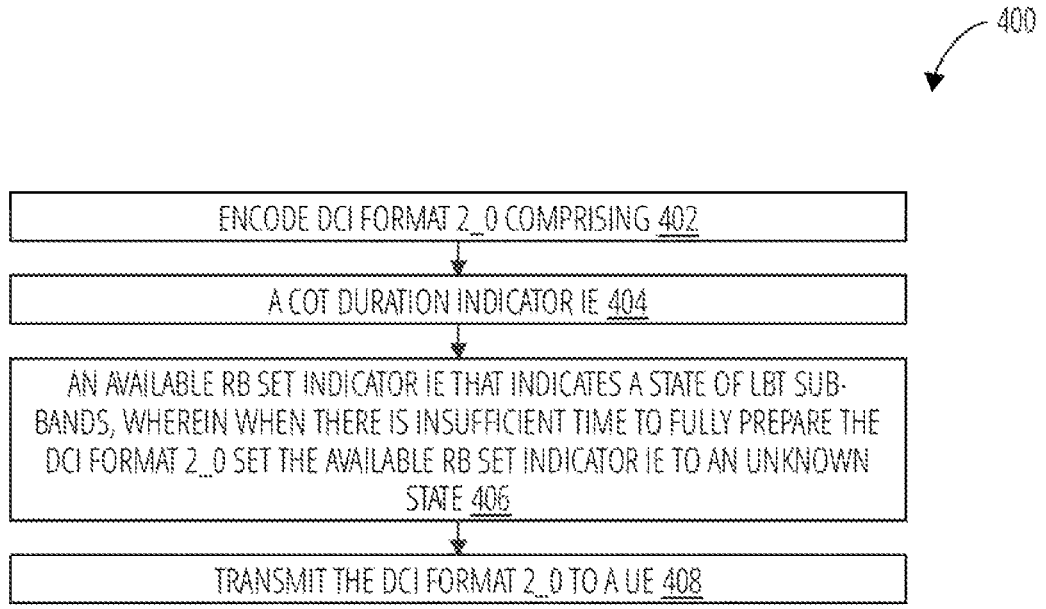
FIG. 4 is a flowchart of a method to be performed by a gNB for a COT structure indication using DCI format 2_0 in accordance with one embodiment.

FIG. 4 is a flowchart of a method 400 to be performed by a gNB for a COT structure indication using DCI format 2_0. In block 402, method 400 encodes DCI format 2_0 comprising. In block 404, method 400 a COT duration indicator IE. In block 406, method 400 an available RB set indicator IE that indicates a state of LBT sub-bands, wherein when there is insufficient time to fully prepare the DCI Format 2_0 set the available RB set indicator IE to an unknown state. In block 408, method 400 transmits the DCI format 2_0 to a UE.

Figure 5:
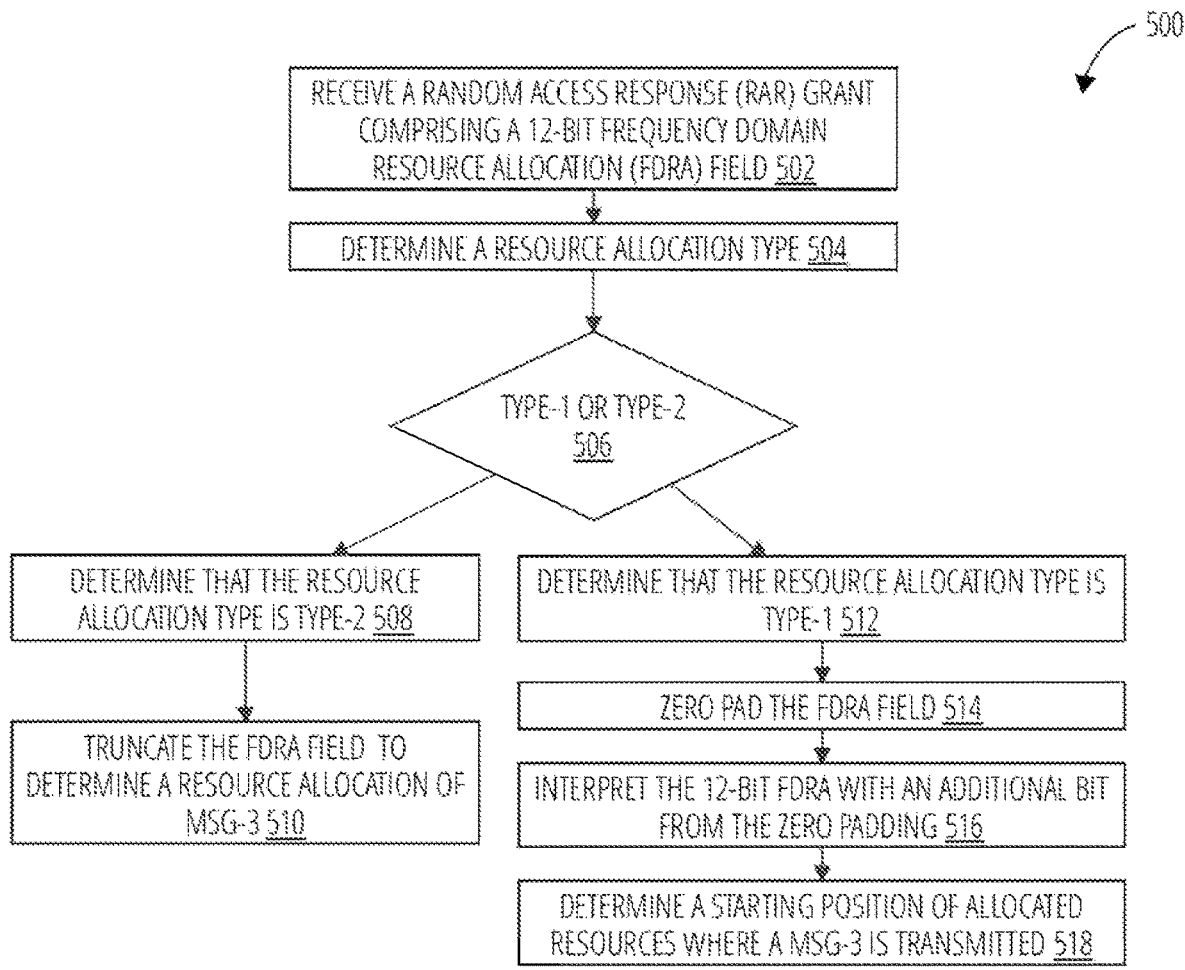
FIG. 5 is a flowchart of a method for determining resource allocation for Msg-3 transmission according to a first embodiment.
Figure 6:
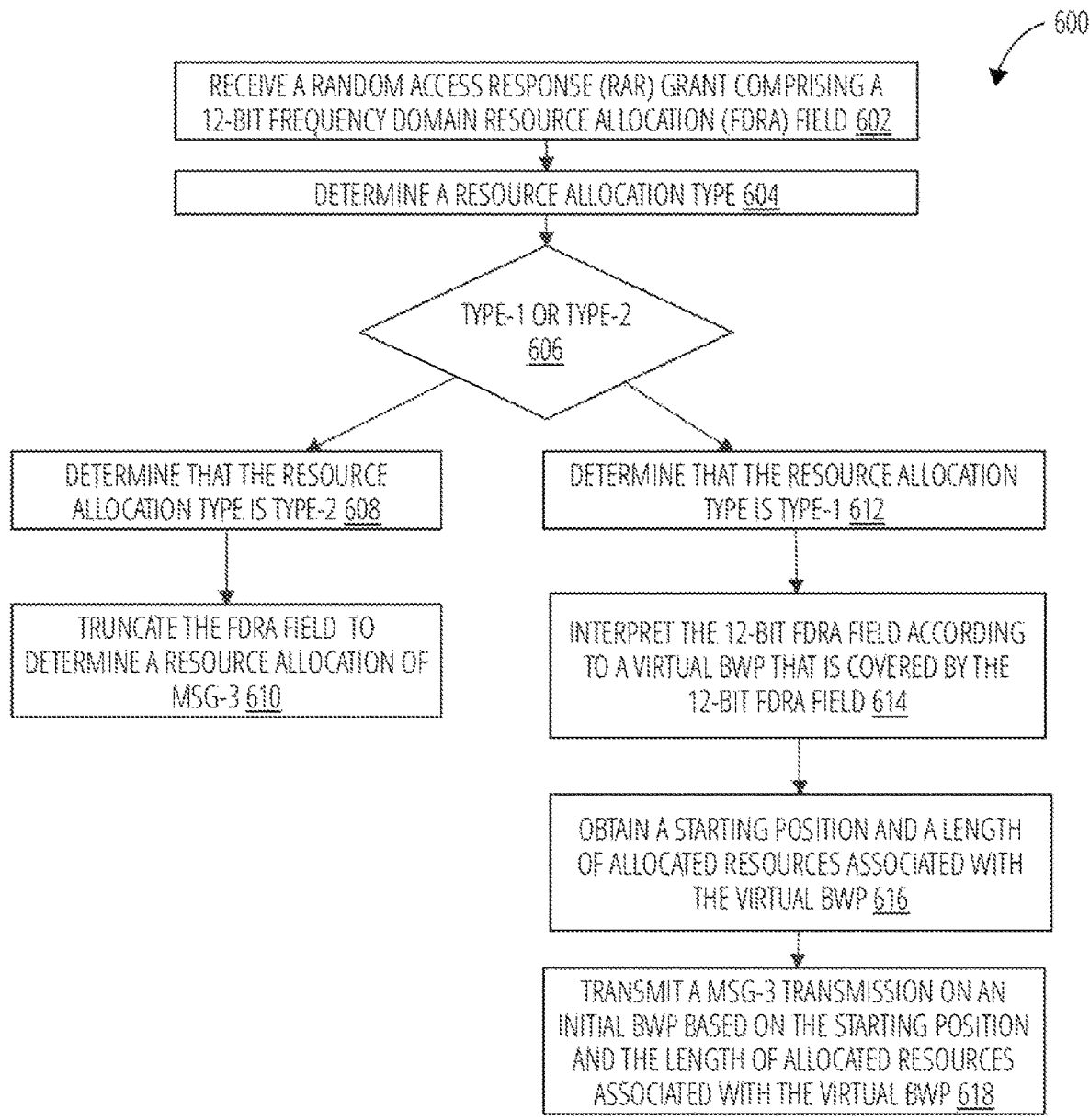
FIG. 6 is a flowchart of a method for determining resource allocation for Msg-3 transmission according to a second embodiment.
Figure 7:
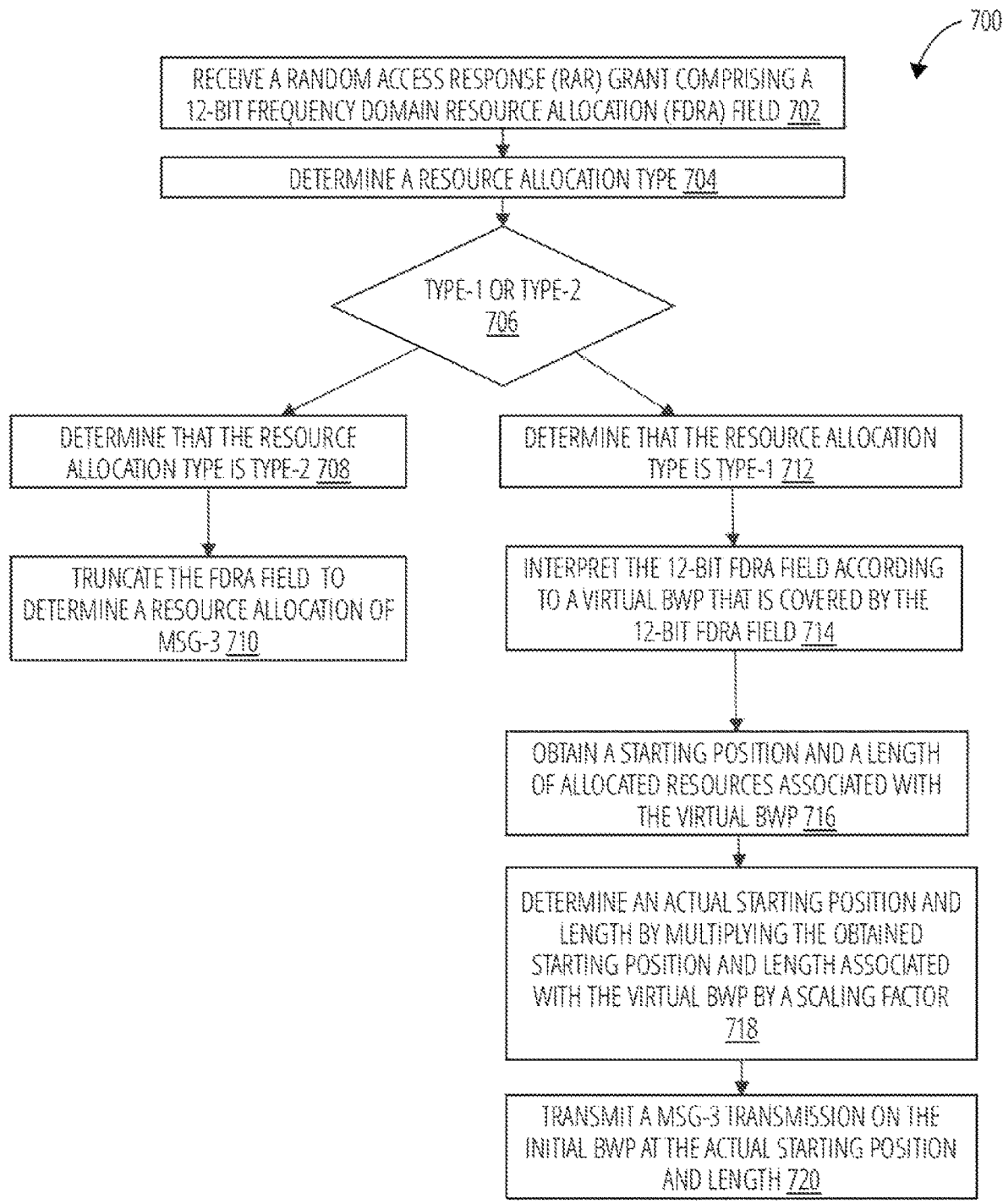
FIG. 7 is a flowchart of a method for determining resource allocation for Msg-3 transmission according to a second embodiment.

FIGS. 5-7 illustrate three methods to determine resource allocation for Msg-3 transmission. Msg-3 is a Scheduled PUSCH Transmission (Msg3). In some embodiments, if Type-1 frequency domain resource allocation is used for initial BWP on unlicensed band, the methods in FIGS. 5-7 can be considered for interpret the 12-bits FDRA field in RAR PDU.

FIG. 5 is a flowchart of a method 500 for determining resource allocation for Msg-3 transmission according to a first embodiment. In this embodiment, the UE uses Zero padding to introduce one bit at the MSB of FDRA field. This embodiment provides full flexibility in the starting position of allocated resources on the 20 MHz initial BWP but may result in limitations in the possible lengths.

In block 502, method 500 receives a random access response (RAR) grant comprising a 12-bit frequency domain resource allocation (FDRA) field. In block 504, method 500 determines a resource allocation type. In decision block 506 the method 500 checks if the resource allocation is type-1 or type-2.

In block 512, method 500 determines that the resource allocation type is type-1. In block 514, method 500 zero pads the FDRA field. In block 516, method 500 interprets the 12-bit FDRA with an additional bit from the zero padding. In block 518, method 500 determines a starting position of allocated resources where a Msg-3 is transmitted.

Figure 8:
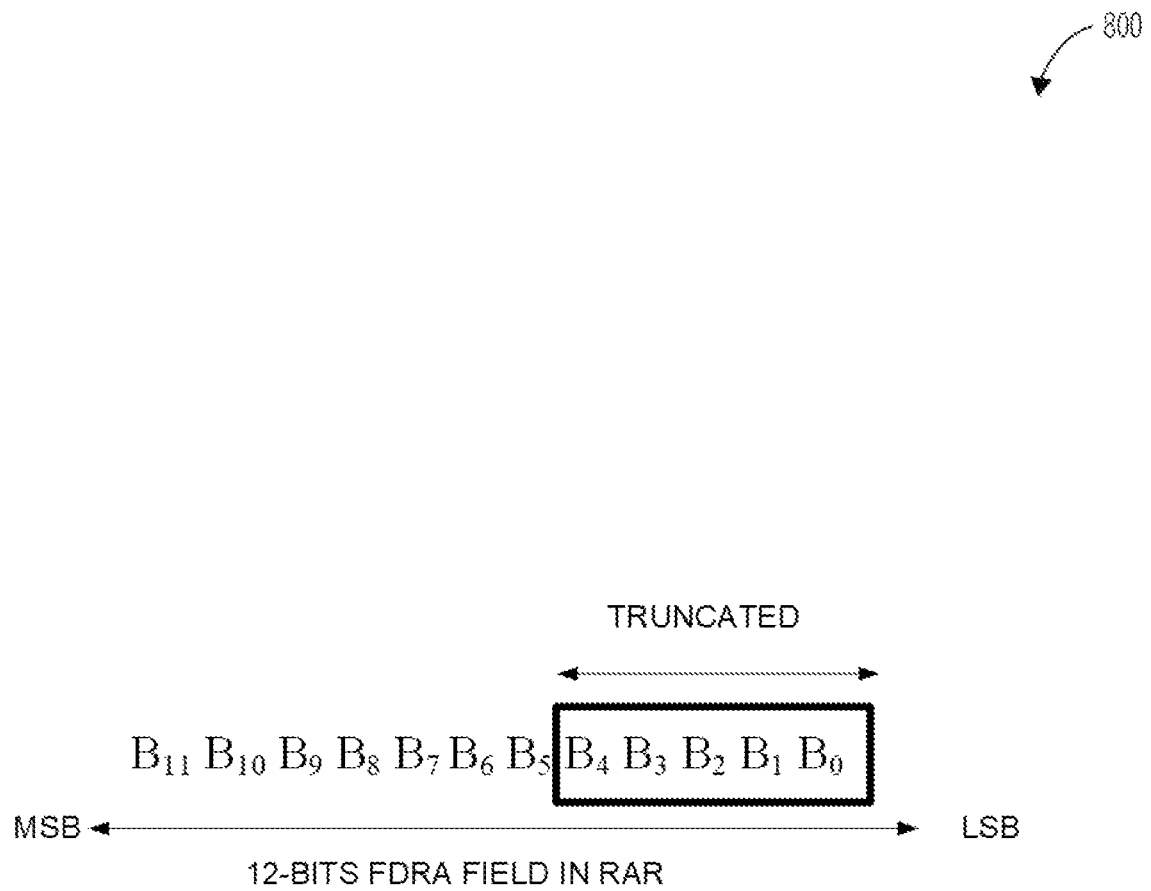
FIG. 8 illustrates a truncation of an FDRA field in accordance with one embodiment.

In block 508, method 500 determines that the resource allocation type is type-2. In block 510, method 500 truncates the FDRA field when the resource allocation type is type-2 to determine a resource allocation of Msg-3. In some embodiments, if uplink resource allocation type 2 is used for Msg-3 transmission, the X least significant bits of the 12-bits FDRA field in RAR are truncated as illustrated in FIG. 8 and the truncated FDRA field is used to determine the resource allocation of Msg-3 transmission on initial BWP. The number of bits to be truncated may change based on the SCS. For example, in some embodiments for 30 kHz SCS X=5 and for 15 kHz SCS X=6.

FIG. 6 is a flowchart of a method 600 for determining resource allocation for Msg-3 transmission according to a second embodiment. The resource allocation field is interpreted in according to a "virtual" BWP that is covered by 12-bits FDRA field. Then, the obtained start and length is applied to the initial BWP where the Msg-3 is transmitted.

The virtual BWP is a portion of a bandwidth of the initial BWP available to the UE. For example, the virtual BWP may cover 15 MHz of the 20 MHz initial BWP. The virtual BWP may be predefined or configured by the UE or gNB. The initial BWP refers to the actual BWP available for resource allocation of the Msg-3 transmission.

In block 602, method 600 receives a random access response (RAR) grant comprising a 12-bit frequency domain resource allocation (FDRA) field. In block 604, method 600 determines a resource allocation type. In block 612, method 600 determines that the resource allocation type is type-1. In block 614, method 600 interprets the 12-bit FDRA field according to a virtual BWP that is covered by the 12-bit FDRA field. In block 616, method 600 obtains a starting position and a length of allocated resources associated with the virtual BWP. In block 618, method 600 transmits a Msg-3 transmission on an initial BWP based on the starting position and the length of allocated resources associated with the virtual BWP. For example, in some embodiment the initial BWP starting position and length is the starting position and a length of allocated resources associated with the virtual BWP.

In block 608, method 600 determines that the resource allocation type is type-2. In block 610, method 600 truncates the FDRA field when the resource allocation type is type-2 to determine a resource allocation of Msg-3. In some embodiments, if uplink resource allocation type 2 is used for Msg-3 transmission, the X least significant bits of the 12-bits FDRA field in RAR are truncated as illustrated in FIG. 8 and the truncated FDRA field is used to determine the resource allocation of Msg-3 transmission on initial BWP. The number of bits to be truncated may change based on the SCS. For example, in some embodiments for 30 kHz SCS X=5 and for 15 kHz SCS X=6.

FIG. 7 is a flowchart of a method 700 for determining resource allocation for Msg-3 transmission according to a third embodiment. In this embodiment, the resource allocation field is interpreted in according to a "virtual" BWP that is covered by 12-bits FDRA field similar to method 600 of FIG. 6. In addition, the obtained start and length of resource allocation is interpreted in terms of group of resource blocks by multiplying with a scaling factor K prior to being applied to the initial BWP. The scaling factor may be set to less than or equal to a bandwidth of an initial BWP divided by a bandwidth of the virtual BWP by using a floor operation For example, the scaling factor may be:

$K \leq \lfloor N_1/N_2 \rfloor, K \in \{1,2,3,4\}$ where:

$N_1$ is the bandwidth of initial BWP, and $N_2$ is the virtual BWP that addressed by 12-bits FDRA field using Type-1 frequency resource allocation.

In block 702, method 700 receives a random access response (RAR) grant comprising a 12-bit frequency domain resource allocation (FDRA) field. In block 704, method 700 determines a resource allocation type. In block 712, method 700 determines that the resource allocation type is type-1. In block 714, method 700 interprets the 12-bit FDRA field according to a virtual BWP that is covered by the 12-bit FDRA field. In block 716, method 700 obtains a starting position and length of allocated resources associated with the virtual BWP. In block 718, method 700 determines an actual starting position and length by multiplying the obtained starting position and length associated with the virtual BWP by a scaling factor. In block 720, method 700 transmits a Msg-3 transmission on the initial BWP at the actual starting position and length.

In block 708, method 700 determines that the resource allocation type is type-2. In block 710, method 700 truncates the FDRA field when the resource allocation type is type-2 to determine a resource allocation of Msg-3. In some embodiments, if uplink resource allocation type 2 is used for Msg-3 transmission, the X least significant bits of the 12-bits FDRA field in RAR are truncated as illustrated in FIG. 8 and the truncated FDRA field is used to determine the resource allocation of Msg-3 transmission on initial BWP. The number of bits to be truncated may change based on the SCS. For example, in some embodiments for 30 kHz SCS X=5 and for 15 kHz SCS X=6.

FIG. 8 illustrates a truncation of an FDRA field 800 in RAR for Msg-3 resource determination for 30 KHz SCS.

Figure 9:
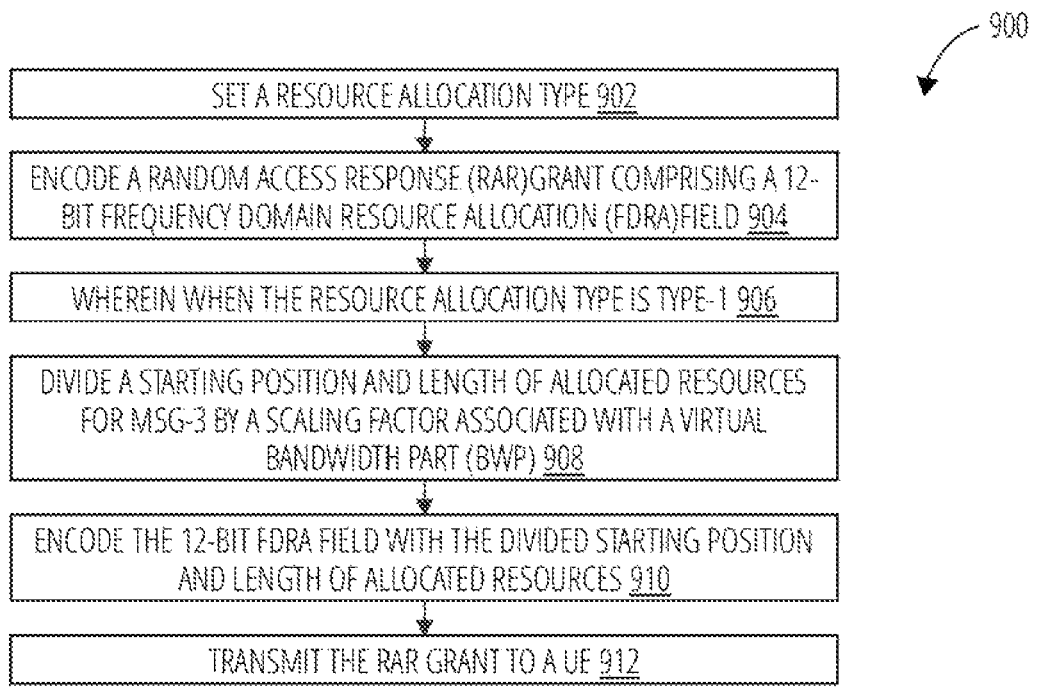
FIG. 9 is a flowchart of a method for a gNB in accordance with one embodiment.

FIG. 9 is a flowchart of a method 900 for a gNB. In block 902, method 900 sets a resource allocation type. In block 904, method 900 encodes a random access response (RAR) grant comprising a 12-bit frequency domain resource allocation (FDRA)field. In block 906, method 900 wherein when the resource allocation type is type-1. In block 908, method 900 divides a starting position and length of allocated resources for Msg-3 by a scaling factor associated with a virtual Bandwidth Part (BWP). In block 910, method 900 encodes the 12-bit FDRA field with the divided starting position and length of allocated resources. In block 912, method 900 transmits the RAR grant to a UE.

Figure 10:
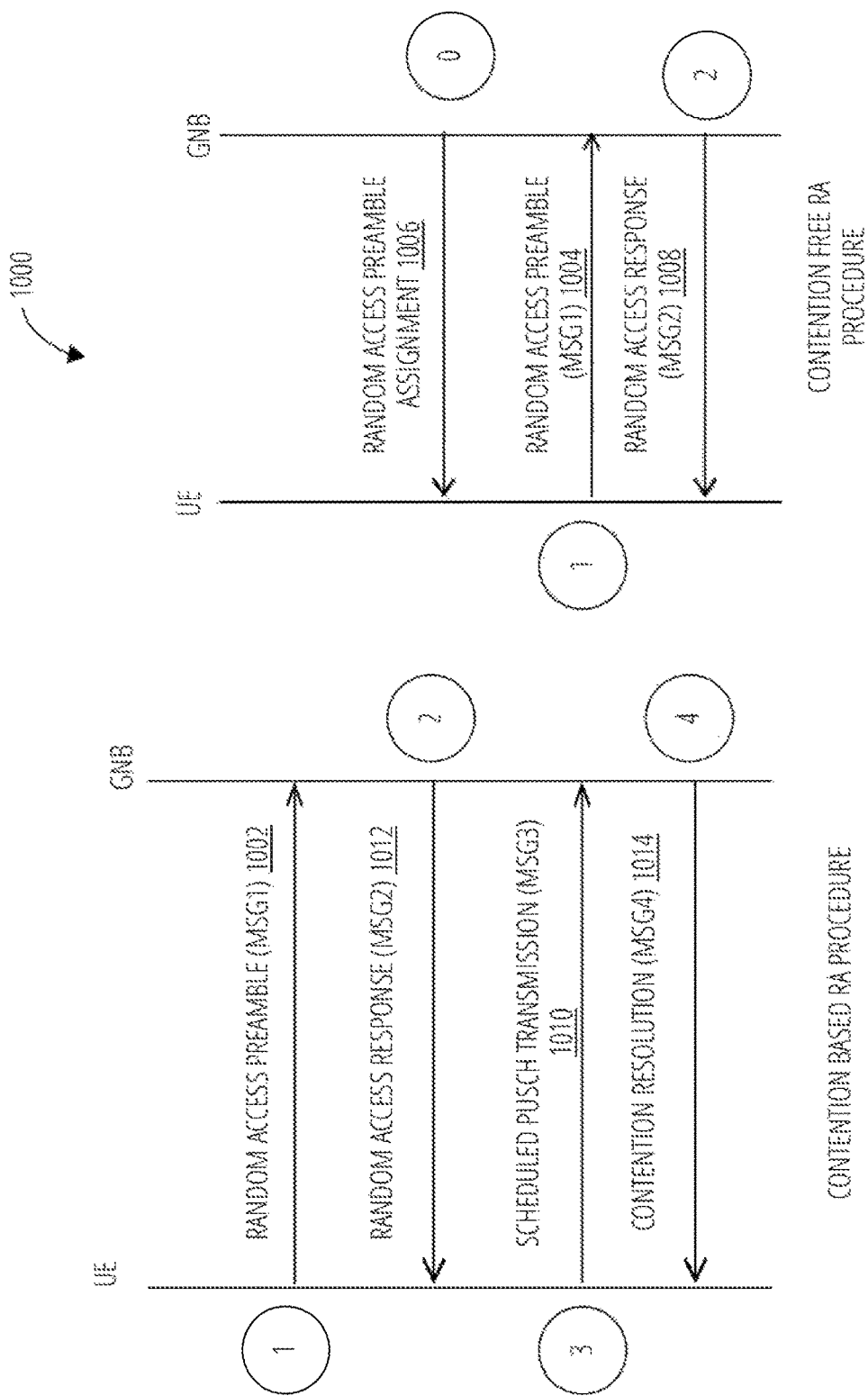
FIG. 10 illustrates a random access (RA) procedure.

FIG. 10 illustrates a random access (RA) procedure 1000. The RA procedure can take two distinct forms: Contention-Based Random Access (CBRA) and Contention-Free Random Access (CFRA).

In CBRA, the UE randomly selects a RA preamble from a pool of preambles shared with other UEs in the cell. The UE transmits 1002 a Random Access Preamble (Msg1) 1002 to the gNB. The gNB receives the Random Access Preamble (Msg1) 1002. The gNB transmits a Random Access Response (Msg2) 1012 to a UE. The UEs decode the Random Access Response (Msg2) 1012 content and transmit Scheduled PUSCH Transmission (Msg3) (Msg3 is also referred to herein as Msg-3) 1010 to the gNB. In the next step, the gNB transmits Contention Resolution (Msg4) 1014 to resolve any contentions between UE resource pools.

In CFRA, the UE uses a dedicated preamble provided by the network specifically to this UE via RRC signaling or PDCCH order. The gNB transmits a Random Access Preamble Assignment 1006 to the UE. The UE decodes the Random Access Preamble Assignment 1006 and transmits the Random Access Preamble (Msg1) 1004. The gNB receives the Random Access Preamble (Msg1) 1004 and transmits the Random Access Response (Msg2) 1008.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 11:
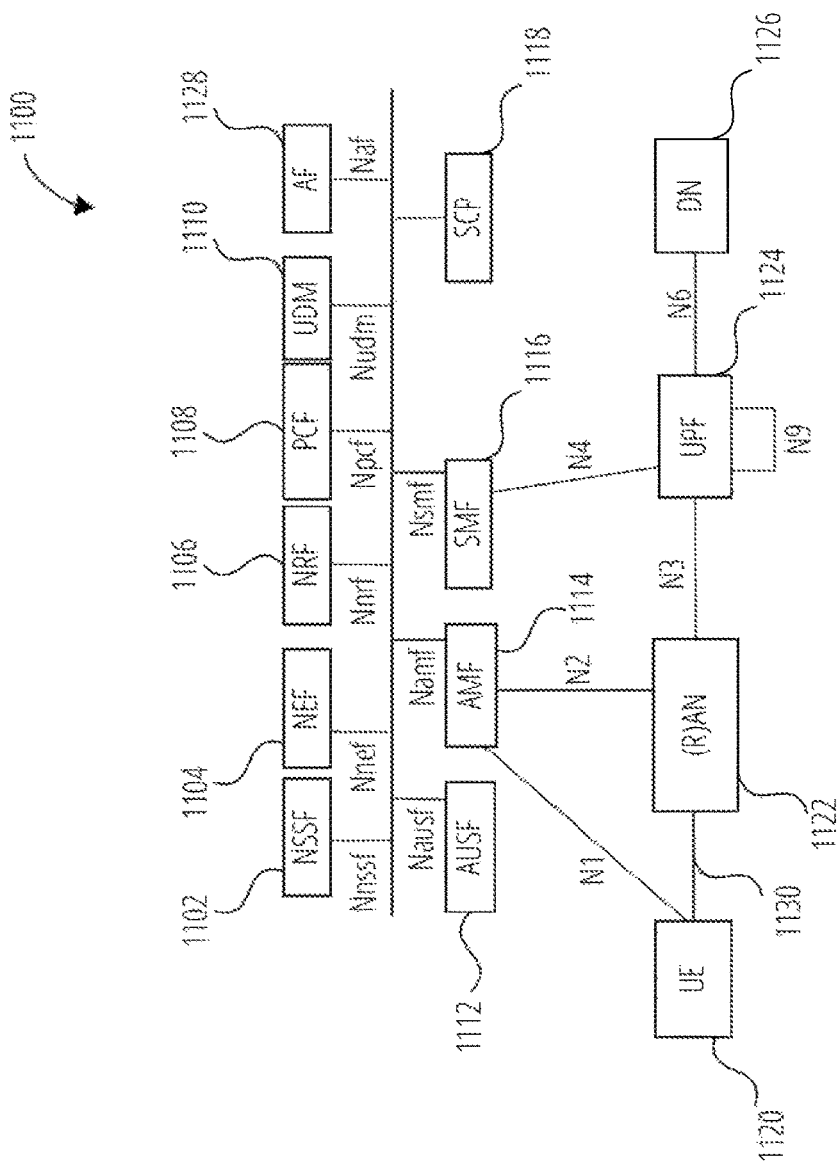
FIG. 11 illustrates an example service based architecture in accordance with certain embodiments.

FIG. 11 illustrates a service based architecture 1100 in 5GS according to one embodiment. As described in 3GPP TS 23.501, the service based architecture 1100 comprises NFs such as an NSSF 1102, a NEF 1104, an NRF 1106, a PCF 1108, a UDM 1110, an AUSF 1112, an AMF 1114, an SMF 1116, for communication with a UE 1120, a (R)AN 1122, a UPF 1124, and a DN 1126. The NFs and NF services can communicate directly, referred to as Direct Communication, or indirectly via a SCP 1118, referred to as Indirect Communication. FIG. 11 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 11 are described below.

The NSSF 1102 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1104 supports exposure of capabilities and events. NF capabilities and events may be securely exposed by the NEF 1104 (e.g., for 3rd party, Application Functions, and/or Edge Computing). The NEF 1104 may store/retrieve information as structured data using a standardized interface (Nudr) to a UDR. The NEF 1104 may also secure provision of information from an external application to 3GPP network and may provide for the Application Functions to securely provide information to the 3GPP network (e.g., expected UE behavior, 5GLAN group information, and service specific information), wherein the NEF 1104 may authenticate and authorize and assist in throttling the Application Functions. The NEF 1104 may provide translation of internal-external information by translating between information exchanged with the AF and information exchanged with the internal network function. For example, the NEF 1104 translates between an AF-Service-Identifier and internal 5G Core information such as DNN and S-NSSAI. The NEF 1104 may handle masking of network and user sensitive information to external AF's according to the network policy. The NEF 1104 may receive information from other network functions (based on exposed capabilities of other network functions), and stores the received information as structured data using a standardized interface to a UDR. The stored information can be accessed and re-exposed by the NEF 1104 to other network functions and Application Functions, and used for other purposes such as analytics. For external exposure of services related to specific UE(s), the NEF 1104 may reside in the HPLMN. Depending on operator agreements, the NEF 1104 in the HPLMN may have interface(s) with NF(s) in the VPLMN. When a UE is capable of switching between EPC and 5GC, an SCEF+NEF may be used for service exposure.

The NRF 1106 supports service discovery function by receiving an NF Discovery Request from an NF instance or SCP and providing the information of the discovered NF instances to the NF instance or SCP. The NRF 1106 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1108 supports a unified policy framework to govern network behavior. The PCF 1108 provides policy rules to Control Plane function(s) to enforce them. The PCF 1108 accesses subscription information relevant for policy decisions in a Unified Data Repository (UDR). The PCF 1108 may access the UDR located in the same PLMN as the PCF.

The UDM 1110 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1110 uses subscription data (including authentication data) that may be stored in a UDR, in which case a UDM implements the application logic and may not require an internal user data storage and several different UDMs may serve the same user in different transactions. The UDM 1110 may be located in the HPLMN of the subscribers it serves, and may access the information of the UDR located in the same PLMN.

The AF 1128 interacts with the Core Network to provide services that, for example, support the following: application influence on traffic routing; accessing the NEF 1104; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 1104 to interact with relevant Network Functions.

The AUSF 1112 supports authentication for 3GPP access and untrusted non-3GPP access. The AUSF 1112 may also provide support for Network Slice-Specific Authentication and Authorization.

The AMF 1114 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1114. Regardless of the number of Network functions, in certain embodiments there is only one NAS interface instance per access network between the UE and the CN, terminated at one of the Network functions that implements at least NAS security and Mobility Management. The AMF 1114 may also include policy related functionalities.

In addition to the functionalities described above, the AMF 1114 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1116 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1116 may include policy related functionalities.

The SCP 1118 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1118 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1120 may include a device with radio communication capabilities. For example, the UE 1120 may comprise a smartphone (e.g., handheld touchscreen mobile computing devices connectable to one or more cellular networks). The UE 1120 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1120 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1120 may be configured to connect or communicatively couple with the (R)AN 1122 through a radio interface 1130, which may be a physical communication interface or layer configured to operate with cellular communication protocols such as a GSM protocol, a CDMA network protocol, a Push-to-Talk (PTT) protocol, a PTT over Cellular (POC) protocol, a UNITS protocol, a 3GPP LTE protocol, a 5G protocol, a NR protocol, and the like. For example, the UE 1120 and the (R)AN 1122 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1122 to the UE 1120 and a UL transmission may be from the UE 1120 to the (R)AN 1122. The UE 1120 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1122 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1122 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1122) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1120 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1124 may act as an anchor point for intra-RAT and inter-RAT mobility, an external PDU session point of interconnect to the DN 1126, and a branching point to support multi-homed PDU session. The UPF 1124 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1124 may include an uplink classifier to support routing traffic flows to a data network. The DN 1126 may represent various network operator services, Internet access, or third party services. The DN 1126 may include, for example, an application server.

Figure 12:
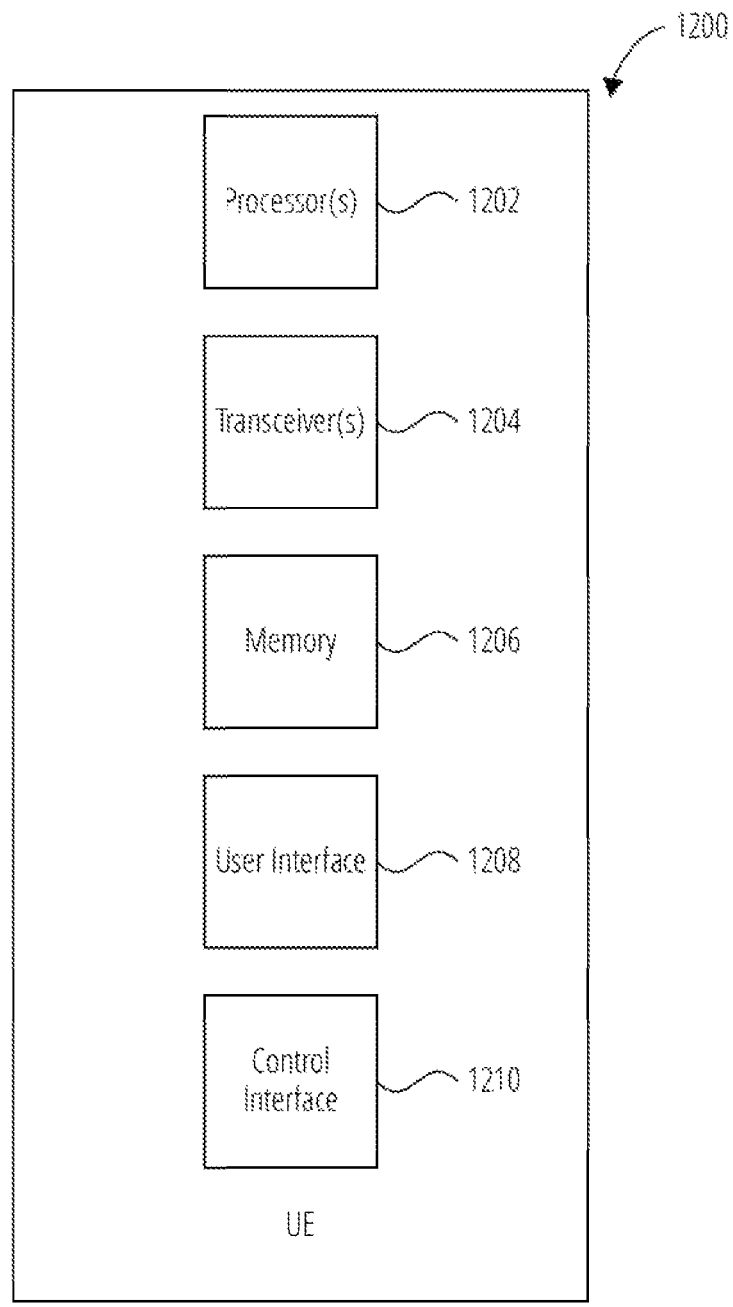
FIG. 12 illustrates a UE in accordance with one embodiment.

FIG. 12 is a block diagram of an example UE 1200 configurable according to various embodiments of the present disclosure, including by execution of instructions on a computer-readable medium that correspond to any of the example methods and/or procedures described herein. The UE 1200 comprises one or more processor 1202, transceiver 1204, memory 1206, user interface 1208, and control interface 1210.

The one or more processor 1202 may include, for example, an application processor, an audio digital signal processor, a central processing unit, and/or one or more baseband processors. Each of the one or more processor 1202 may include internal memory and/or may include interface(s) to communication with external memory (including the memory 1206). The internal or external memory can store software code, programs, and/or instructions for execution by the one or more processor 1202 to configure and/or facilitate the UE 1200 to perform various operations, including operations described herein. For example, execution of the instructions can configure the UE 1200 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can b e utilized in conjunction with the one or more transceiver 1204, user interface 1208, and/or control interface 1210. As another example, the one or more processor 1202 may execute program code stored in the memory 1206 or other memory that corresponds to MAC, RLC, PDCP, and RRC layer protocols standardized by 3GPP (e.g., for NR and/or LTE). As a further example, the processor 1202 may execute program code stored in the memory 1206 or other memory that, together with the one or more transceiver 1204, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1206 may comprise memory area for the one or more processor 1202 to store variables used in protocols, configuration, control, and other functions of the UE 1200, including operations corresponding to, or comprising, any of the example methods and/or procedures described herein. Moreover, the memory 1206 may comprise non-volatile memory (e.g., flash memory), volatile memory (e.g., static or dynamic RAM), or a combination thereof. Furthermore, the memory 1206 may interface with a memory slot by which removable memory cards in one or more formats (e.g., SD Card, Memory Stick, Compact Flash, etc.) can be inserted and removed.

The one or more transceiver 1204 may include radio-frequency transmitter and/or receiver circuitry that facilitates the UE 1200 to communicate with other equipment supporting like wireless communication standards and/or protocols. For example, the one or more transceiver 1204 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1202. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1204 includes a transmitter and a receiver that enable device 1200 to communicate with various 5G/NR networks according to various protocols and/or methods proposed for standardization by 3GPP and/or other standards bodies. For example, such functionality can operate cooperatively with the one or more processor 1202 to implement a PHY layer based on OFDM, OFDMA, and/or SC-FDMA technologies, such as described herein with respect to other figures.

The user interface 1208 may take various forms depending on particular embodiments, or can be absent from the UE 1200. In some embodiments, the user interface 1208 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 may comprise a tablet computing device including a larger touchscreen display. In such embodiments, one or more of the mechanical features of the user interface 1208 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1200 having a touch screen display are capable of receiving user inputs, such as inputs related to exemplary methods and/or procedures described herein or otherwise known to persons of ordinary skill in the art.

In some exemplary embodiments of the present disclosure, the UE 1200 may include an orientation sensor, which can be used in various ways by features and functions of the UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1210 may take various forms depending on particular embodiments. For example, the control interface 1210 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1210 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1200 may include more functionality than is shown in FIG. 12 including, for example, a video and/or still-image camera, microphone, media player and/or recorder, etc. Moreover, the one or more transceiver 1204 may include circuitry for communication using additional radio-frequency communication standards including Bluetooth, GPS, and/or others. Moreover, the one or more processor 1202 may execute software code stored in the memory 1206 to control such additional functionality. For example, directional velocity and/or position estimates output from a GPS receiver can be available to any application program executing on the UE 1200, including various exemplary methods and/or computer-readable media according to various exemplary embodiments of the present disclosure.

Figure 13:
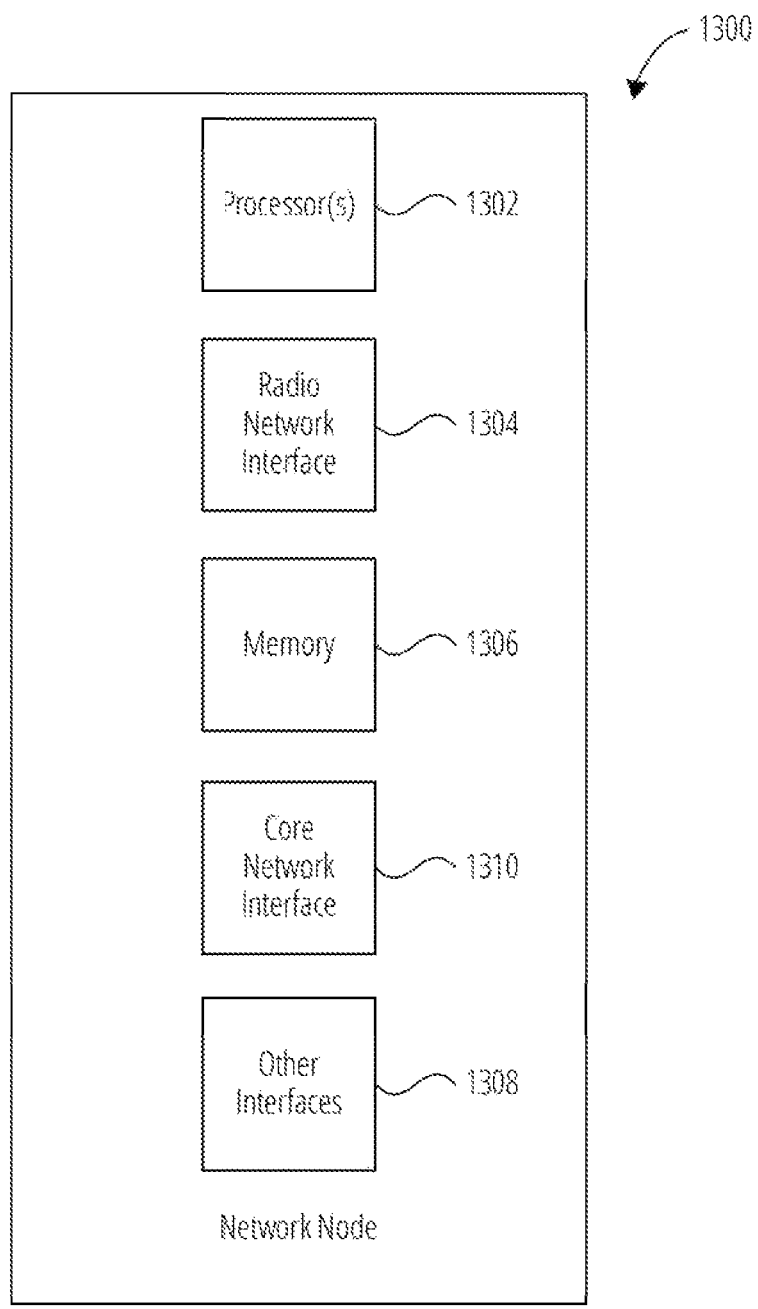
FIG. 13 illustrates a network node in accordance with one embodiment.

FIG. 13 is a block diagram of an example network node 1300 configurable according to various embodiments of the present disclosure, including by execution of instructions on a computer-readable medium that correspond to any of the example methods and/or procedures described herein.

The network node 1300 includes a one or more processor 1302, a radio network interface 1304, a memory 1306, a core network interface 1310, and other interfaces 1308. The network node 1300 may comprise, for example, a base station, eNB, gNB, access node, or component thereof.

The one or more processor 1302 may include any type of processor or processing circuitry and may be configured to perform an of the methods or procedures disclosed herein. The memory 1306 may store software code, programs, and/or instructions executed by the one or more processor 1302 to configure the network node 1300 to perform various operations, including operations described herein. For example, execution of such stored instructions can configure the network node 1300 to communicate with one or more other devices using protocols according to various embodiments of the present disclosure, including one or more methods and/or procedures discussed above. Furthermore, execution of such stored instructions can also configure and/or facilitate the network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1304 and the core network interface 1310. By way of example and without limitation, the core network interface 1310 comprise an S1 interface and the radio network interface 1304 may comprise a Uu interface, as standardized by 3GPP. The memory 1306 may also store variables used in protocols, configuration, control, and other functions of the network node 1300. As such, the memory 1306 may comprise non-volatile memory (e.g., flash memory, hard disk, etc.), volatile memory (e.g., static or dynamic RAM), network-based (e.g., "cloud") storage, or a combination thereof.

The radio network interface 1304 may include transmitters, receivers, signal processors, ASICs, antennas, beamforming units, and other circuitry that enables network node 1300 to communicate with other equipment such as, in some embodiments, a plurality of compatible user equipment (UE). In some embodiments, the network node 1300 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1304 may include a PHY layer based on OFDM, OFDMA, and/or SC-FDMA technologies. In some embodiments, the functionality of such a PHY layer can be provided cooperatively by the radio network interface 1304 and the one or more processor 1302.

The core network interface 1310 may include transmitters, receivers, and other circuitry that enables the network node 1300 to communicate with other equipment in a core network such as, in some embodiments, circuit-switched (CS) and/or packet-switched Core (PS) networks. In some embodiments, the core network interface 1310 may include the S1 interface standardized by 3GPP. In some embodiments, the core network interface 1310 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1310 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1308 may include transmitters, receivers, and other circuitry that enables the network node 1300 to communicate with external networks, computers, databases, and the like for purposes of operations, administration, and maintenance of the network node 1300 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE) for operations in an unlicensed spectrum, the method comprising:
receiving a random access response (RAR) grant comprising a 12-bit frequency domain resource allocation (FDRA) field;
determining a resource allocation type; and
in response to the resource allocation type being type-1 and allocated resources being on a 20 MHz initial Bandwidth Part (BWP) on an unlicensed band:
zero padding the FDRA field;
interpreting the 12-bit FDRA with an additional bit from the zero padding; and
determining a starting position of the allocated resources where a Scheduled Physical Uplink Shared Channel (PUSCH) Transmission is transmitted in an unlicensed spectrum.

2. The method of claim 1, wherein the zero padding introduces a bit at a most significant bit (MSB) of the FDRA field.

3. The method of claim 1, further comprising truncating the FDRA field when the resource allocation type is type-2 to determine a resource allocation of the Scheduled PUSCH Transmission.

4. The method of claim 3, wherein five least significant bits (LSB) of the FDRA field are truncated for 30 kHz subcarrier spacing (SCS).

5. The method of claim 3, wherein six LSB of the FDRA field are truncated for 15 kHz spacing (SCS).

6. An apparatus for a UE, comprising:
a memory interface to access a random access response (RAR) grant comprising a 12-bit frequency domain resource allocation (FDRA) field;
a baseband processing unit coupled to the memory interface, the baseband processing unit to:
decode the RAR grant;
determine a resource allocation type; and
when the resource allocation type is type-1,
interpret the 12-bit FDRA field according to a virtual Bandwidth Part (BWP) that is covered by the 12-bit FDRA field,
obtain a starting position and a length of allocated resources associated with the virtual BWP;
multiply the obtained starting position and the length associated with the virtual BWP by a scaling factor to obtain an initial BWP starting position and an initial BWP length, wherein the scaling factor is set to less than or equal to a bandwidth of an initial BWP of an unlicensed spectrum divided by a bandwidth of the virtual BWP by using a floor operation; and
transmit a Scheduled Physical Uplink Shared Channel (PUSCH) Transmission on the initial BWP of an unlicensed spectrum using the initial BWP starting position and the initial BWP length that are based on the starting position and the length of the allocated resources associated with the virtual BWP.

7. The apparatus of claim 6, wherein the virtual BWP comprises a portion of a bandwidth of the initial BWP available to the UE.

8. The apparatus of claim 6, wherein the initial BWP starting position and the initial BWP length is the starting position and the length of the allocated resources associated with the virtual BWP.

9. The apparatus of claim 6, wherein the baseband processing unit is further to multiply the obtained starting position and length associated with the virtual BWP by a scaling factor to obtain the initial BWP starting position and length.

10. The apparatus of claim 9, wherein the scaling factor is less than or equal to a bandwidth of the initial BWP divided by a bandwidth of the virtual BWP.

11. The apparatus of claim 9, wherein the scaling factor facilitates Scheduled PUSCH Transmission messages outside a bandwidth of the virtual BWP.

12. The apparatus of claim 6, wherein the baseband processing unit is further to truncate the FDRA field when the resource allocation type is type-2 to determine a resource allocation for the Scheduled PUSCH Transmission.

13. A method for a Next Generation NodeB (gNB) for operations in an unlicensed spectrum, the method comprising:
setting a resource allocation type;
encoding a random access response (RAR) grant comprising a 12-bit frequency domain resource allocation (FDRA) field,
wherein in response to the resource allocation type being type-1,
dividing a starting position and length of allocated resources for Scheduled Physical Uplink Shared Channel (PUSCH) Transmission by a scaling factor associated with a virtual Bandwidth Part (BWP), wherein the scaling factor is set to less than or equal to a bandwidth of an initial BWP of an unlicensed spectrum divided by a bandwidth of the virtual BWP by using a floor operation; and
encoding the 12-bit FDRA field with the divided starting position and length of allocated resources; and
transmitting the RAR grant to a UE.

14. The method of claim 13, wherein the virtual BWP comprises a portion of a bandwidth of the initial BWP available to the gNB.

15. The method of claim 13, further comprising transmitting the Scheduled PUSCH Transmission according to the starting position and length of allocated resources.

16. The method of claim 13, wherein the RAR grant is transmitted outside of the virtual BWP.

17. The method of claim 13, wherein when the resource allocation type is type-2, encoding the 12-bit FDRA field such that five or six LSB can be truncated by the UE to determine a resource allocation for the Scheduled PUSCH Transmission.

18. The method of claim 13, wherein the scaling factor is 1, 2, 3, or 4.

* * * * *